United States Patent
Bostrom et al.

(12)

(10) Patent No.: US 10,665,361 B2
(45) Date of Patent: May 26, 2020

(54) SCORCH-RETARDING POLYMER COMPOSITION

(71) Applicant: BOREALIS TECHNOLOGY OY, Porvoo (FI)

(72) Inventors: Jan-Ove Bostrom, Odsmal (SE); Annika Smedberg, Myggenas (SE); Ruth Dammert, Stenungsund (SE); Lena Lindbom, Kungalv (SE); Nigel Hampton, Forest Park, GA (US); Bill Gustafsson, Stenungsund (SE); Ulf Nilsson, Stenungsund (SE); Perry Nylander, Gothenburg (SE); Claes Broman, Odsmal (SE)

(73) Assignee: BOREALIS TECHNOLOGY OY, Porvoo (FI)

( * ) Notice: Subject to any disclaimer, the term of this patent is extended or adjusted under 35 U.S.C. 154(b) by 213 days.

(21) Appl. No.: 15/088,323

(22) Filed: Apr. 1, 2016

(65) Prior Publication Data

US 2016/0217882 A1 Jul. 28, 2016

Related U.S. Application Data

(63) Continuation of application No. 11/884,900, filed as application No. PCT/EP2006/001649 on Feb. 23, 2006.

(30) Foreign Application Priority Data

Feb. 25, 2005 (EP) ..................... 05004359

(51) Int. Cl.
| | |
|---|---|
| *H01B 3/44* | (2006.01) |
| *C08K 5/01* | (2006.01) |
| *C08K 5/14* | (2006.01) |
| *C09D 123/08* | (2006.01) |

(52) U.S. Cl.
CPC .............. *H01B 3/441* (2013.01); *C08K 5/01* (2013.01); *C08K 5/14* (2013.01); *C09D 123/083* (2013.01); *Y10T 428/2933* (2015.01)

(58) Field of Classification Search
CPC ........ C08K 5/01; C08K 5/14; C09D 123/083; C08L 23/083; C08L 23/02; Y10T 428/2933; H01B 3/441
See application file for complete search history.

(56) References Cited

U.S. PATENT DOCUMENTS

| | | | |
|---|---|---|---|
| 2,888,419 A | 5/1959 | Safford | |
| 3,378,510 A | 4/1968 | Wheat | |
| 3,954,907 A | 5/1976 | Schober | |
| 4,239,644 A | 12/1980 | Nambu et al. | |
| 5,187,009 A | 2/1993 | Kimura et al. | |
| 5,272,213 A | 12/1993 | Knowles et al. | |
| 5,298,564 A | 3/1994 | Suyama et al. | |
| 5,539,075 A | 7/1996 | Gustafsson et al. | |
| 6,103,807 A * | 8/2000 | Carter ..................... | C08K 5/01 |
| | | | 524/481 |
| 6,143,822 A | 11/2000 | Caronia et al. | |
| 6,187,847 B1 | 2/2001 | Cogen et al. | |
| 6,231,978 B1 | 5/2001 | Keogh | |
| 6,277,925 B1 | 8/2001 | Biswas et al. | |
| 6,635,727 B1 * | 10/2003 | Koda ..................... | C08F 210/18 |
| | | | 521/140 |
| 2002/0039654 A1 | 4/2002 | Gustafsson et al. | |
| 2002/0169238 A1 | 11/2002 | Caronia et al. | |
| 2007/0145625 A1 | 6/2007 | Caronia et al. | |

FOREIGN PATENT DOCUMENTS

| | | |
|---|---|---|
| EP | 0 453 204 A1 | 10/1991 |
| EP | 0 475 561 A1 | 3/1992 |
| EP | 0 952 180 A1 | 10/1999 |
| EP | 1 041 583 A1 | 10/2000 |
| EP | 1 605 473 A1 | 12/2005 |
| JP | 6089612 A2 | 3/1994 |
| JP | H06-089612 | 3/1994 |
| JP | 2000-502117 | 2/2000 |
| KR | 1994-7002894 | 9/1994 |
| KR | 2003-0086597 | 11/2003 |
| WO | WO 99/33069 A1 | 7/1999 |

OTHER PUBLICATIONS

Polymer Journal; vol. 27; No. 4; pp. 319-448; 1995.
Henning et al.; Fundamentals of Curing Elastomers with Peroxides and Coagents II: Understanding the Relationship Between Coagent and Elastomer; Cray Valley USA, LLC.; pp. 1-19.
Smedberg et al.; Characterization and crosslinking properties of a poly(ethylene-co-divinylsiloxane); Polymer; vol. 45; pp. 4845-4855; 2004.
A.A. Strepikheev, V.A. Derevitskaya, *The principles of high molecular compounds chemistry.* Chimia, Moscow, 1976. Translation of the relevant extract from the book (p. 74).

\* cited by examiner

*Primary Examiner* — Scott R. Walshon
(74) *Attorney, Agent, or Firm* — Fay Sharpe LLP

(57) ABSTRACT

A crosslinkable polymer composition includes an unsaturated polyolefin having a total amount of carbon-carbon double bonds/1000 carbon atoms of at least 0.1, at least one scorch retarder, and at least one crosslinking agent.

30 Claims, No Drawings

SCORCH-RETARDING POLYMER COMPOSITION

CROSS-REFERENCE TO RELATED APPLICATIONS

This application is a continuation of U.S. patent application Ser. No. 11/884,900, filed on Nov. 20, 2007, which is a 371 of PCT Application No. PCT/EP2006/001649, filed Feb. 23, 2006, which claimed priority to EP Application No. EP 05004359.5, filed Feb. 25, 2005.

BACKGROUND

The present invention relates to polymer compositions having low scorch during extrusion. Furthermore, it relates to articles, in particular multilayered articles like power cables, comprising such polymer compositions.

In general, the degree of unsaturation of polyolefins is dependent on specific conditions chosen for the polymerisation process. This is true for high pressure as well as low pressure conditions. If e.g. polyethylene is produced by radical polymerisation (so-called low-density polyethylene LDPE), the number of double bonds within the polymer is usually quite low. However, in many situations, it is desirable to use polymers having a higher degree of unsaturation which may serve to introduce functional groups into the polymer molecule or to effect crosslinking of the polymer.

The crosslinking of polyolefins like polyethylene is relevant for many applications, such as extrusion (e.g. of tubes, cable insulating material or cable sheathing), blow moulding, or rotational moulding. In particular in cable technology, crosslinking is of special interest since deformation resistance at elevated temperature of the cable can be improved.

In WO 93/08222, an unsaturated low-density polyethylene (LDPE) having improved crosslinking properties was prepared by high pressure radical polymerisation of ethylene and a specific type of polyunsaturated comonomers. The increased amount of unsaturation of the LDPE copolymer increases the crosslinking activity when combined with a crosslinking agent.

As indicated above, crosslinkable polyolefins are of interest for applying coating layers on power cables by extrusion. In such an extrusion process of a power cable, the metallic conductor is generally first coated with a semiconductive layer, followed by an insulating layer and another semiconductive layer. These layers are normally crosslinked and are normally made of cross-linked ethylene homopolymers and/or ethylene copolymers.

Cross-linking can be effected by adding free-radical forming agents like peroxides to the polymeric material prior to or during extrusion. The free-radical forming agent should preferably remain stable during extrusion performed at a temperature low enough to minimize the early decomposition of the peroxide but high enough to obtain proper melting and homogenisation. Furthermore, the crosslinking agent should decompose in a subsequent cross-linking step at elevated temperature. If e.g. a significant amount of peroxide already decomposes in the extruder, thereby initiating premature crosslinking, this will result in the formation of so-called "scorch", i.e. inhomogeneity, surface uneveness and possibly discolouration in the different layers of the resultant cable. Thus, any significant decomposition of free-radical forming agents during extrusion should be avoided. On the other hand, thermal treatment at the elevated temperature of the extruded polyolefin layer should result in high crosslinking speed and high crosslinking efficiency.

In EP-A-0453204 and EP-A-0475561, 2,4-diphenyl-4-methyl-1-pentene is added to polymer compositions to suppress the formation of scorch. These applications do not relate to unsaturated polyolefins.

Furthermore, during the crosslinking step, by-products can be generated due to decomposition of crosslinking agents. Most by-products are captured within the cable and the volatile fraction thereof has to be removed in a so-called degassing step. The more by-products generated, the longer the degassing time and/or the higher the degassing temperature. However, mild degassing conditions would be preferred. Milder degassing conditions would also reduce the risk of damaging the cables during the degassing step.

BRIEF DESCRIPTION

One object of the present invention is to provide a polyolefin composition having low scorch during extrusion but improved crosslinking properties if vulcanized after extrusion. In particular, it is an object to increase crosslinking speed and/or to reduce the amount of crosslinking agent without adversely affecting scorch behaviour. Furthermore, it is an object to provide crosslinked polymer articles which can be degassed at reduced degassing time and/or under mild degassing conditions, in particular lower degassing temperature.

These objects are solved by the polymer compositions and the processes as defined in the claims.

The crosslinkable polymer composition according to the present invention comprises
(i) an unsaturated polyolefin having a total amount of carbon-carbon double bonds/1000 carbon atoms of at least 0.1,
(ii) at least one scorch retarder, and
(iii) at least one crosslinking agent.

DETAILED DESCRIPTION

In the context of the present invention, the term "total amount of carbon-carbon double bonds" refers to those double bonds originating from vinyl groups, vinylidene groups and trans-vinylene groups. The amount of each type of double bond is measured as indicated in the experimental part.

The incorporation of the total amount of carbon-carbon double bonds according to the present invention within the polyolefin component enables to accomplish improved crosslinking properties.

In a preferred embodiment, the total amount of carbon-carbon double bonds is at least 0.15/1000 C-atoms. In other preferred embodiments, the total amount of carbon-carbon double bonds is at least 0.20, at least 0.25, at least 0.30, at least 0.35, at least 0.40, at least 0.45, at least 0.50, at least 0.55, at least 0.60, at least 0.65, at least 0.70, at least 0.75 or at least 0.80/1000 C-atoms.

The total amount of vinyl groups is preferably at least 0.04/1000 carbon atoms. In other preferred embodiments, it is at least 0.08, at least 0.10, at least 0.15, at least 0.20, at least 0.25, at least 0.30, at least 0.35, at least 0.40, at least 0.45, at least 0.50, at least 0.55, at least 0.60, at least 0.65, at least 0.70, at least 0.75 or at least 0.80 vinyl groups/1000 carbon atoms. Of course, since a vinyl group is a specific type of carbon-carbon double bond, the total amount of vinyl groups for a given unsaturated polyolefin does not exceed its total amount of double bonds.

Two types of vinyl groups can be differentiated. One type of vinyl group is generated by the polymerisation process (e.g. via a β-scission reaction of a secondary radical) or results from the use of chain transfer agents introducing vinyl groups. Another type of vinyl group may originate from a polyunsaturated comonomer used for the preparation of the unsaturated polyolefin, as will be described later in greater detail.

Preferably, the amount of vinyl groups originating from the polyunsaturated comonomer is at least 0.03/1000 carbon atoms. In other preferred embodiments, the amount of vinyl groups originating from the polyunsaturated comonomer is at 0.06, at least 0.09, at least 0.12, at least 0.15, at least 0.18, at least 0.21, at least 0.25, at least 0.30, at least 0.35 or at least 0.40/1000 carbon atoms.

In addition to the vinyl groups originating from the polyunsaturated comonomer, the total amount of vinyl groups may further comprise vinyl groups originating from a chain transfer agent which introduces vinyl groups, such as propylene.

Preferred unsaturated polyolefins of the present invention may have densities higher than 0.860, 0.880, 0.900, 0.910, 0.915, 0.917, or 0.920 g/cm³.

The polyolefin can be unimodal or multimodal, e.g. bimodal.

In the present invention, the unsaturated polyolefin is preferably an unsaturated polyethylene or an unsaturated polypropylene. Most preferably, the unsaturated polyolefin is an unsaturated polyethylene. Unsaturated polyethylene of low density is preferred. In a preferred embodiment, the unsaturated polyethylene contains at least 60 wt-% ethylene monomer units. In other preferred embodiments, the unsaturated polyethylene contains at least 70 wt-%, at least 80 wt-% or at least 90 wt-% ethylene monomer units.

Preferably, the unsaturated polyolefin is prepared by copolymerising at least one olefin monomer with at least one polyunsaturated comonomer. In a preferred embodiment, the polyunsaturated comonomer consists of a straight carbon chain with at least 8 carbon atoms and at least 4 carbon atoms between the non-conjugated double bonds, of which at least one is terminal.

Ethylene and propylene are preferred olefin monomers. Most preferably, ethylene is used as the olefin monomer. As a comonomer, a diene compound is preferred, e.g. 1,7-octadiene, 1,9-decadiene, 1,11-dodecadiene, 1,13-tetradecadiene, or mixtures thereof. Furthermore, dienes like 7-methyl-1,6-octadiene, 9-methyl-1,8-decadiene, or mixtures thereof can be mentioned.

Siloxanes having the following formula:

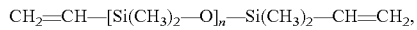

CH$_2$=CH—[Si(CH$_3$)$_2$—O]$_n$—Si(CH$_3$)$_2$—CH=CH$_2$, wherein n=1 or higher
can also be used as a polyunsaturated comonomer. As an example, divinylsiloxanes, e.g. α,ω-divinylsiloxane, can be mentioned.

In addition to the polyunsaturated comonomer, further comonomers can optionally be used. Such optional comonomers are selected from C$_3$-C$_{20}$ alpha-olefins such as propylene, 1-butene, 1-hexene and 1-nonene, polar comonomers such as acrylates, methacrylates or acetates.

As an example, the crosslinkable polymer composition may contain small amounts of one or more polar comonomer units, such as 1-100 micromole, 2-80 micromole and 5-60 micromole polar comonomer units per gram of unsaturated polyolefin.

The unsaturated polyolefin can be produced by any conventional polymerisation process. Preferably, it is produced by radical polymerisation, such as high pressure radical polymerisation. High pressure polymerisation can be effected in a tubular reactor or an autoclave reactor. Preferably, it is a tubular reactor. Further details about high pressure radical polymerisation are given in WO93/08222, which is herewith incorporated by reference. However, the unsaturated polyolefin can also be prepared by other types of polymerisation process such as coordination polymerisation, e.g. in a low pressure process using any type of supported and non-supported polymerization catalyst. As an example, multi-site including dual site and single site catalyst systems such as Ziegler-Natta, chromium, metallocenes of transition metal compounds, non-metallocenes of late transition metals, said transition and later transition metal compounds belonging to group 3-10 of the periodic table (IUPAC 1989). The coordination polymerization processes and the mentioned catalysts are well-known in the field and may be commercially available or produced according to known literature.

The crosslinkable polymer composition according to the present invention further comprises a crosslinking agent. In the context of the present invention, a crosslinking agent is defined to be any compound capable to generate radicals which can initiate a crosslinking reaction. Preferably, the crosslinking agent contains at least one —O—O— bond or at least one —N=N— bond. More preferably, the crosslinking agent is a peroxide known in the field.

The cross-linking agent, e.g. a peroxide, is preferably added in an amount of 0.1-3.0 wt.-%, more preferably 0.15-2.6 wt.-%, most preferably 0.2-2.2 wt.-%, based on the weight of the crosslinkable polymer composition.

As peroxides used for crosslinking, the following compounds can be mentioned: di-tert-amylperoxide, 2,5-di(tert-butylperoxy)-2,5-dimethyl-3-hexyne, 2,5-di(tert-butylperoxy)-2,5-dimethylhexane, tert-butylcumylperoxide, di(tert-butyl)peroxide, dicumylperoxide, di(tert-butylperoxy-isopropyl)benzene, butyl-4,4-bis(tert-butylperoxy)valerate, 1,1-bis(tert-butylperoxy)-3,3,5-trimethylcyclohexane, tert-butylperoxybenzoate, dibenzoylperoxide.

Preferably, the peroxide is selected from 2,5-di(tert-butylperoxy)-2,5-dimethyl-hexane, di(tert-butylperoxy-isopropyl)benzene, dicumylperoxide, tert-butylcumylperoxide, di(tert-butyl)peroxide, or mixtures thereof. Most preferably, the peroxide is dicumylperoxide.

The crosslinkable polymer composition according to the present invention further comprises a scorch retarder. In the context of the present invention, a "scorch retarder" is defined to be a compound that reduces the formation of scorch during extrusion of a polymer composition if compared to the same polymer composition extruded without said compound. Besides scorch retarding properties, the scorch retarder may simultaneously result in further effects like boosting, i.e. enhancing crosslinking performance.

Preferably, the scorch retarder is selected from 2,4-diphenyl-4-methyl-1-pentene, substituted or unsubstituted diphenylethylene, quinone derivatives, hydroquinone derivatives, monofunctional vinyl containing esters and ethers, or mixtures thereof. More preferably, the scorch retarder is selected from 2,4-diphenyl-4-methyl-1-pentene, substituted or unsubstituted diphenylethylene, or mixtures thereof. Most preferably, the scorch retarder is 2,4-diphenyl-4-methyl-1-pentene.

Preferably, the amount of scorch retarder is within the range of 0.005 to 1.0 wt.-%, more preferably within the range of 0.01 to 0.8 wt.-%, based on the weight of the crosslinkable polyolefin composition. Further preferred ranges are 0.03 to 0.75 wt-%, 0.05 to 0.70 wt-% and 0.07 to 0.50 wt-%, based on the weight of the crosslinkable polyolefin composition.

Since the unsaturated polyolefin component of the present invention is provided with a total amount of carbon-carbon double bonds/1000 C-atoms of at least 0.1, it is more reactive compared to a material without double bonds. It could then be assumed that the unsaturated polymeric material is more prone to scorch. However, with the crosslinkable polyolefin composition of the present invention, it is unexpectedly possible to maintain the good crosslinking properties in the vulcanisation step and an improved resistance to scorch, although the composition has an increased reactivity.

The polymer composition may contain further additives, such as antioxidants, stabilisers, processing aids, and/or crosslinking boosters. As antioxidant, sterically hindered or semi-hindered phenols, aromatic amines, aliphatic sterically hindered amines, organic phosphates, thio compounds, and mixtures thereof, can be mentioned. Typical cross-linking boosters may include compounds having an allyl group, e.g. triallylcyanurate, triallylisocyanurate, and di-, tri- or tetra-acrylates. As further additives, flame retardant additives, acid scavengers, inorganic fillers and voltage stabilizers can be mentioned.

If an antioxidant, optionally a mixture of two or more antioxidants, is used, the added amount can range from 0.005 to 2.5 wt-%, based on the weight of the unsaturated polyolefin. If the unsaturated polyolefin is an unsaturated polyethylene, the antioxidant(s) are preferably added in an amount of 0.005 to 0.8 wt-%, more preferably 0.01 to 0.60 wt-%, even more preferably 0.05 to 0.50 wt-%, based on the weight of the unsaturated polyethylene. If the unsaturated polyolefin is an unsaturated polypropylene, the antioxidant(s) are preferably added in an amount of 0.005 to 2 wt-%, more preferably 0.01 to 1.5 wt-%, even more preferably 0.05 to 1 wt-%, based on the weight of the unsaturated polypropylene.

Further additives may be present in an amount of 0.005 to 3 wt %, more preferably 0.005 to 2 wt %. Flame retardant additives and inorganic fillers can be added in higher amounts.

From the crosslinkable polymer composition described above, a cross-linked composition can be prepared by treatment under crosslinking conditions, thereby increasing the crosslinking level. Crosslinking can be effected by treatment at increased temperature, e.g. at a temperature of at least 160° C. When peroxides are used, crosslinking is generally initiated by increasing the temperature to the decomposition temperature of the corresponding peroxide.

Due to the presence of a total amount of carbon-carbon double bonds/1000 C-atoms of at least 0.1 within the unsaturated polyolefin in combination with a scorch retarder, a lower crosslinking temperature can be used, thereby still reaching sufficiently high crosslinking levels. Lower crosslinking temperature is beneficial in cases where temperature sensitive materials are used. Furthermore, lower crosslinking temperature may result in a lower amount of volatile by-products.

When crosslinking is initiated, in particular by peroxides, residues are left in the crosslinked composition. To remove these by-products, it is preferred to subject the crosslinked composition to a so-called degassing step. Typically, degassing is effected at elevated temperature. The less by-products have been generated in the crosslinked composition, the milder are degassing conditions and/or the less degassing time is needed.

Since crosslinking has been facilitated by providing an unsaturated polyolefin having a total amount of carbon-carbon double bonds/1000 C-atoms of at least 0.1, the amount of crosslinking agent, which is necessary to achieve the same degree of crosslinking, can be reduced. As a consequence, the amount of by-products generated during crosslinking can be reduced and milder degassing conditions can be chosen. An additional effect, due to the reduced peroxide content, is also that a lower antioxidant level may be used as well, still maintaining good resistance against thermooxidative ageing.

The crosslinkable polymer composition of the present invention does not only enable a reduction of the amount of crosslinking agent but also results in a crosslinked composition from which volatile by-products are removable within a significantly shorter period of time. In particular for the manufacturing of high quality crosslinked polymer compositions having a low amount of detrimental volatile by-products, the degassing time is reduced significantly. In the context of the present invention, volatile by-products comprise any low-molecular compounds which are captured within the polymer composition after the crosslinking step and are removable by thermal treatment at a temperature low enough to avoid significant degradation of the polymeric material. These volatile products are particularly generated during the crosslinking step.

In a preferred crosslinked polymer composition of the present invention, the percentage level of removable volatiles still remaining in the crosslinked polymer composition is less than or equal to 0.5 wt % of the crosslinked polymer composition, after a period of time which is at least 10% shorter compared to the period of time which is necessary to decrease the level of volatiles in a reference material to the same value, i.e. to less than or equal to 0.5 wt % of the crosslinked polymer composition, wherein the reference material is a crosslinked polymer composition prepared from an unsaturated polyolefin having a total amount of carbon-carbon double bonds/1000 carbon atoms of 0.37 and a crosslinking agent but without a scorch retarder. The period of time for reducing the percentage level of removable volatiles to less than or equal to 0.5 wt % of the crosslinked polymer composition is measured on plaques as described in the experimental part.

The crosslinked composition preferably has a total weight change between 0-30 minutes at 175° C. of less than 1.12 wt.-% as measured according to HD632 A:1 1998, part 2, on a 1.8 mm crosslinked plaque as described in the experimental part.

Preferably, the crosslinked polymer composition has a hot set elongation value of less than 175%, more preferably less than 100%, even more preferably less than 90%, determined according to IEC 60811-2-1. Hot set elongation values are related to the degree of cross-linking. The lower the hot set elongation value, the more crosslinked is the material.

Total weight loss after 168 h degassing at 60° C., measured on a 1.8 mm thick plaque having an area of 6-7 cm×6-7 cm, should be less than 2.2 wt %, more preferably less than 2.1 wt %, and even more preferably less than 20 wt % and most preferably less than 1.9 wt %.

Weight loss and weight change data have been obtained by measurements on plaques. All plaques used in the present invention were made according to the same method as described in the experimental part under "(b) Pressing of plaques for hot set, TGA and plaque degassing measurements".

From the crosslinkable polymer composition of the present invention, a multilayered article can be prepared wherein at least one layer comprises said polymer composition. When crosslinking is initiated, a crosslinked multilayered article is obtained. Preferably, the multilayered article (either crosslinked or not) is a power cable.

In the context of the present invention, a power cable is defined to be a cable transferring energy operating at any voltage. The voltage applied to the power cable can be alternating (AC), direct (DC), or transient (impulse). In a preferred embodiment, the multilayered article is a power cable operating at voltages higher than 1 kV. In other preferred embodiments, the power cable prepared according to the present invention is operating at voltages higher than 6 kV, higher than 10 kV, higher than 33 kV, higher than 66 kV, higher than 72 kV, or higher than 110 kV.

The multilayered article can be prepared in a process wherein the crosslinkable composition of the present invention is applied onto a substrate by extrusion. In such an extrusion process, the sequence of mixing the components of the crosslinkable composition can be varied, as explained below.

According to a preferred embodiment, the unsaturated polyolefin is mixed with one or more antioxidants, possibly in combination with further additives, either on solid pellets or powder or by melt mixing, followed by forming pellets from the melt. Subsequently, the crosslinking agent, preferably a peroxide, and the scorch retarder are added to the pellets or powder in a second step. Alternatively, the scorch retarder could already be added in the first step, together with the antioxidant(s). The final pellets are fed to the extruder, e.g. a cable extruder.

According to another preferred embodiment, instead of a two-step process, the unsaturated polyolefin, preferably in the form of pellets or powder, the crosslinking agent, the scorch retarder, optionally antioxidant(s) and/or further additives, are added to a compounding extruder, single or twin screw. Preferably, the compounding extruder is operated under careful temperature control.

According to another preferred embodiment, a mix of all components, i.e. including crosslinking agent and scorch retarder, optionally antioxidant(s) and/or further additives, are added onto the pellets or powder made of the unsaturated polyolefin.

According to another preferred embodiment, pellets made of the unsaturated polyolefin, optionally further containing antioxidant(s) and additional additives, are prepared in a first step, e.g. by melt mixing. These pellets are then fed into the cable extruder. Subsequently, crosslinking agent and scorch retarder are either fed in the hopper or directly into the cable extruder. Alternatively, crosslinking agent and/or scorch retarder are already added to the pellets before feeding these pellets into the cable extruder.

According to another preferred embodiment, pellets made of the unsaturated polyolefin without any additional components are fed to the extruder. Subsequently, crosslinking agent and scorch retarder, optionally in combination with antioxidant(s) and/or further additives, are either fed in the hopper or directly fed into the polymeric melt within the cable extruder. Alternatively, at least one of these components, i.e. crosslinking agent, scorch retarder, antioxidant, or a mixture of these components is already added to the pellets before feeding these pellets into the cable extruder.

According to another preferred embodiment, a highly concentrated master batch is prepared. The master batch may also comprise one or more antioxidants, scorch retarder and crosslinking agent. This master batch is then added to/mixed with the unsaturated polyolefin. Alternatively, only two of these components are present in the starting master batch whereas the third component (i.e. either antioxidant(s), crosslinking agent, or scorch retarder) is added separately.

When producing a power cable by extrusion, the polymer composition can be applied onto the metallic conductor and/or at least one coating layer thereof, e.g. a semiconductive layer or insulating layer. Typical extrusion conditions are mentioned in WO 93/08222.

According to a preferred embodiment, extrusion, e.g. cable extrusion, is effected at a temperature satisfying the following relationship:

$$(19517/(273.15+T))-\ln t \leq 43.55$$

wherein
T: extrusion temperature in ° C., and
t: time in minutes it takes at the extrusion temperature T from the start of the torque measurement to reach an increase in torque of 1 dNm from the minimum value in the torque curve.

Even more preferably, extrusion (e.g. cable extrusion) is effected at a temperature satisfying the following relationships:

$$(19517/(273.15+T))-\ln t \leq 43.4$$

wherein T and t are defined as described above.

The increase in torque is measured on a Monsanto MDR 2000 rheometer using press-moulded circular plaques as described in the experimental part under "(c) Monsanto scorch test".

Preferably, the extrusion temperature is higher than 120° C. In case extrusion is carried out in a cable extruder, the extrusion temperature is preferably within the range of 120° C. to 160° C.

In an extrusion process satisfying the relationship given above and using the crosslinkable polymer composition according to the present invention, an improved balance between scorch and extrusion rate is obtained.

To produce the final power cable, the extruded polymer composition is treated under cross-linking conditions, also known as vulcanisation. Preferably, it is treated at a temperature of at least 160° C., even more preferably at least 170° C. When a peroxide is used, the temperature is preferably raised above its decomposition temperature.

Due to the presence of a total amount of at least 0.1 carbon-carbon double bonds within the unsaturated polyolefin in combination with a scorch retarder, a lower crosslinking temperature can be used, and still reaching sufficiently high crosslinking levels. Lower crosslinking temperature is beneficial in cases where temperature sensitive materials are used.

Due to the improved crosslinking ability, a lower temperature setting can be used in the continuous vulcanisation (CV) tube. This might be relevant if strippable outer semiconductive screens are used as they are more temperature sensitive resulting in a lower throughput on the line. Thus, with the crosslinkable polymer composition of the present invention, it is possible to maintain the output even if the temperature settings are lowered in the tube for continuous vulcanisation.

As already indicated above, the crosslinking step can result in the formation of residues which are left in the cable insulation. If crosslinking is initiated by peroxides, e.g. dicumylperoxide, these by-products typically comprise compounds like methane, ethane, cumylalcohol, α-methylstyrene or acetophenone which are captured within the cable. To remove volatile by-products, the cable is preferably subjected to a degassing step.

The invention is now further elucidated by making reference to the following examples.

EXAMPLES

Testing Methods/Measuring Methods (a) Determination of the Amount of Double Bonds The procedure for the determination of the amount of double bonds/1000 C-atoms is based upon the ASTM D3124-72 method. In that method, a detailed description for the determination of vinylidene groups/1000 C-atoms is given based on 2,3-dimethyl-1,3-butadiene. This sample preparation procedure has also been applied for the determination of vinyl groups/1000 C-atoms, vinylidene groups/1000 C-atoms and trans-vinylene groups/1000 C-atoms in the present invention. However, for the determination of the extinction coefficient for these three types of double bonds, the following three compounds have been used: 1-decene for vinyl, 2-methyl-1-heptene for vinylidene and trans-4-decene for trans-vinylene, and the procedure as described in ASTM-D3124 section 9 was followed.

The total amount of double bonds was analysed by means of IR spectrometry and given as the amount of vinyl bonds, vinylidene bonds and trans-vinylene bonds, respectively.

Thin films were pressed with a thickness of 0.5-1.0 mm. The actual thickness was measured. FT-IR analysis was performed on a Perkin Elmer 2000. Four scans were recorded with a resolution of 4 cm$^{-1}$.

A base line was drawn from 980 cm$^{-1}$ to around 840 cm$^{-1}$. The peak heights were determined at around 888 cm$^{-1}$ for vinylidene, around 910 cm$^{-1}$ for vinyl and around 965 cm$^{-1}$ for trans-vinylene. The amount of double bonds/1000 carbon atoms was calculated using the following formulas (ASTM D3124-72):

vinylidene/1000 C-atoms=(14×$A$)/(18.24×$L$×$D$)

vinyl/1000 C-atoms=(14×$A$)/(13.13×$L$×$D$)

trans-vinylene/1000 C-atoms=(14×$A$)/(15.14×$L$×$D$)

wherein
A: absorbance (peak height)
L: film thickness in mm
D: density of the material (b) Pressing of Plaques for Hot Set, TGA and Plaque Degassing Measurements First, the pellets were melted at 115° C. at around 20 bar for 2 minutes. The pressure was increased to 200 bar, followed by ramping the temperature up to 165° C. The material was kept at 165° C. for 25 minutes and after that it was cooled down to room temperature at a cooling rate of 15° C./min. The thickness of the plaque was around 1.8 mm.

1. Degassing Experiments as Measured by TGA on Crosslinked Plaques

The crosslinking by-product concentration was determined according to HD632 A1:1998, Part 2. A detailed description can be found under 2.4.15.

The following three properties were determined:
Total weight change of the test samples during the first 30 minutes of the test. According to the specification, this should be less than 1.6% of the original sample weight.
Rate of change of weight during the first 5 minutes of the test.
Average rate of change of sample weight between 15 to 30 minutes testing time.

These measurements were performed in a thermogravimetric analyser (TGA). A sample taken from the crosslinked plaque directly after its preparation, having a weight of 20±5 mg is analysed. The temperature is raised from 30° C. to 175±3° C. with a heating rate of 50° C./min. The weight loss experiments are carried out at a constant temperature of 175° C.

2. Degassing Experiments as Measured as Total Weight Loss on Plaques:

Directly after the pressing step, the plaque was divided into smaller pieces with an area of 6-7 cm×6-7 cm. These smaller plaques were weighed and then placed in an oven at 60° C. After that, the plaques were weighed after different periods of time. The total weight loss of the plaque after one week of degassing (168 h) was determined.

(c) Monsanto Scorch Test

The resistance to scorch formation of the different formulations was evaluated in a Monsanto MDR2000 rheometer. The experiments were carried out using press-moulded circular plaques. The circular plaque was pressed at 120° C., 2 min. without pressure followed by 2 min. at a pressure of 5 tons. Then, the plaque was cooled to room temperature. The increase in torque was monitored as a function of time in the Monsanto rheometer. The time needed to reach a certain increase of torque was determined. In this case, the time it takes from the start of the test until an increase of 1 dNm in torque from the minimum value in the torque curve has been reached is reported. The longer time it takes, the more resistant is the formulation to the formation of scorch. Data were generated at three different temperatures, i.e. 135° C., 140° C. and 145° C. Data for the inventive formulations as well as for the reference/comparative formulations are presented in Tables 3 and 4.

(d) Elastograph Measurements of the Degree of Crosslinking

The degree of crosslinking was determined on a Gottfert Elastograph. The measurements were carried out using press-moulded circular plaques. First, a circular plaque was pressed at 120° C., 2 min. without pressure, followed by 2 min. at 5 tons. Then, the circular plaque was cooled to room temperature. In the Elastograph, the evolution of the torque is measured as a function of crosslinking time at 180° C. The test was used to monitor that the degree of crosslinking was comparable in the different samples.

The reported torque values are those reached after 10 minutes of crosslinking at 180° C.

(e) Hot Set Measurements

The hot set elongation as well as the permanent deformation were determined on samples taken from the crosslinked plaques, prepared as described above (i.e. under (b), Pressing of plaques for hot set, TGA and plaque degassing measurements). These properties were determined according to IEC 60811-2-1. In the hot set test, a dumbbell of the tested material is equipped with a weight corresponding to 20 N/cm$^2$. This specimen is put into an oven at 200° C. and after 15 minutes, the elongation is measured. Subsequently, the weight is removed and the sample is allowed to relax for 5 minutes. Then, the sample is taken out from the oven and is cooled down to room temperature. The permanent deformation is determined.

(f) Ash Content

Around 4 g of the polymer, exact weight is noted, was put into a porcelain crucible. This was then heated and the sample turns into ashes. The procelain crucible is put into an oven at 450° C. for 1 h. After that treatment, the porcelain crucible containing the ash is allowed to cool down in a desiccator. The ash is weighed and the ash content is calculated.

Materials

Polymer 1:

Poly(ethylene-co-1,7-octadiene) polymer, ash content <0.025%, $MFR_2$=2.7 g/10 mm.

Polymer 2:

Poly(ethylene-co-1,7-octadiene) polymer, ash content <0.025%, $MFR_2$=2.1 g/10 min.

Polymer 3:

Low density polyethylene, $MFR_2$=2.0 g/10 min.

The double bond content of polymers 1-3 is summarised in table 1.

Then, it is assumed that the base level of vinyl groups, i.e. the ones formed by the process without the addition of chain transfer agent resulting in vinyl groups and without the presence of a polyunsaturated comonomer, the same for the reference and for polymers 1 and 2. This base level is then subtracted from the measured amount of vinyl groups in polymers 1 and 2, thereby resulting in the amount of vinyl groups/1000 C-atoms, which result from the polyunsaturated comonomer.

All polymers were polymerised in a high pressure tubular reactor at a pressure of 1000 to 3000 bar and a temperature of 100 to 300° C. All polymers have a density within the range of 0.920-0.925 g/cm³.

The final formulations including polymers 1-3 are summarised in table 2.

TABLE 2

Summary of used formulations

| formulation | polymer | antioxidant content (wt.-%) | crosslinking agent content (wt.-%) | scorch retarder content (wt.-%) | Elastograph value (Nm) | Hot set elongation (%) |
|---|---|---|---|---|---|---|
| formulation 1 | 1 | 0.09 | 1.0 | 0.15 | 0.60 | 50 |
| formulation 2 | 1 | 0.09 | 1.35 | 0.45 | 0.61 | 44 |
| formulation 3 | 1 | 0.21 | 1.3 | 0.15 | 0.60 | 50 |
| formulation 4 | 1 | 0.21 | 1.60 | 0.45 | 0.65 | 43 |
| formulation 5 | 2 | 0.10 | 1.45 | 0.15 | 0.62 | 62 |
| formulation 6 | 2 | 0.10 | 1.50 | 0.45 | 0.62 | 60 |
| formulation 7 | 2 | 0.23 | 1.70 | 0.15 | 0.62 | 66 |
| formulation 8 | 2 | 0.23 | 1.75 | 0.45 | 0.62 | 55 |
| reference | 3 | 0.20 | 2.1 | 0 | 0.64 | 56 |
| comparative formulation 1 | 1 | 0.09 | 0.90 | 0 | 0.61 | 51 |
| comparative formulation 2 | 1 | 0.21 | 1.20 | 0 | 0.60 | 49 |
| comparative formulation 3 | 2 | 0.10 | 1.60 | 0 | 0.60 | 72 |
| comparative formulation 4 | 2 | 0.23 | 1.80 | 0 | 0.63 | 63 |

TABLE 1

Double bond content

| sample | vinyl/ 1000 C | vinyl- idene/ 1000 C | trans- vinylene/ 1000 C | total double bond content/ 1000 C | vinyls originating from diene/ 1000 C |
|---|---|---|---|---|---|
| polymer 1 | 0.82 | 0.24 | 0.11 | 1.17 | 0.71 |
| polymer 2 | 0.26 | 0.21 | 0.06 | 0.53 | 0.15 |
| polymer 3 | 0.11 | 0.22 | 0.04 | 0.37 | — |

The amount of vinyl groups originating from the polyunsaturated comonomer (i.e. in this example 1,7-octadiene) per 1000 carbon atoms was determined as follows:

Inventive polymers 1 and 2 and reference polymer 3 have been produced on the same reactor, basically using the same conditions, i.e. similar temperature, pressure and production rate. The total amount of vinyl groups of each polymer was determined by FT-IR measurements, as described above.

For the formulations summarized in Table 2, the following compounds were used as an antioxidant, a crosslinking agent and a scorch retarder, respectively:

antioxidant: 4,4'-thiobis(2-tertbutyl-5-methylphenol) (CAS number 96-69-5)

crosslinking agent: Dicumylperoxide (CAS number 80-43-3)

scorch retarder: 2,4-diphenyl-4-methyl-1-pentene (CAS number 6362-80-7)

The formulations have been crosslinked to a degree within the range of 40-70%, as measured by the hot set test, to make the comparison of scorch as clear as possible.

Summary of Results

Example 1

In example 1, the inventive formulations 5-6 are compared with the reference material and comparative formulation 3 with respect to suppression of scorch formation. The results are presented in table 3.

TABLE 3

Scorch performance formulations 5 and 6

| Sample | Hot set elongation value (%) | Time to reach 1 dNm increase in torque at 135° C. (min) | Time to reach 1 dNm increase in torque at 140° C. (min) | Time to reach 1 dNm increase in torque at 145° C. (min) | Temperature that could be used if scorch time of ref. at 135° C. were allowed | Temperature that could be used if scorch time of ref. at 135° C. were allowed in % |
|---|---|---|---|---|---|---|
| formulation 5 | 62 | 110 | 60 | 35 | 139.1° C.[1] | 3.03% |
| formulation 6 | 60 | 146 | 77 | 45 | 140.2° C.[1] | 3.85% |
| ref. | 56 | 72 | 43 | 25 | 135° C. | 0% |
| comp. formulation 3 | 72 | 69 | 40 | 25 | | |

[1]calculated via the exponential curve obtained from the scorch time measured at different temperatures.

These data clearly indicate the significant difference in the prevention of scorch that can be achieved in the unsaturated polymers in combination with a scorch retarder like 2,4-diphenyl-4-methyl-1-pentene. Even if the same peroxide loading can be used in comparative formulation 3 to reach the same degree of crosslinking, the scorch time is rather short, compared to formulations 5 and 6 according to the present invention.

Either the improved resistance to scorch formation can be used to increase the running time until a certain torque is reached, or the extruder could be operated at a higher melt temperature and still have the same scorch formation as with conventional compounds. The higher melt temperature is later on improving the crosslinking performance as there will be a smaller difference between the melt temperature in the extruder and the crosslinking temperature in the vulcanising tube. Both these two options are of advantage for the cable manufacturer as both options increase the productivity. The first option increases productivity as it enables longer running times before the extruder has to be stopped and cleaned (minimizes the stop time when the extruder is not in use) and the second option increases the productivity as the delta in temperature, i.e. from the extruder melt temperature to the actual crosslinking temperature, is smaller thereby increasing the output rate of the cable line. This second option offers even more benefits if a temperature sensitive outer semiconductive material is used.

Example 2

Again, scorch performance of different samples was tested. The results are shown in table 4.

TABLE 4

Scorch performance for inventive formulation 1 and 2

| Sample | Hot set elongation value (%) | Time to reach 1 dNm increase in torque at 135° C. (min) | Time to reach 1 dNm increase in torque at 140° C. (min) | Time to reach 1 dNm increase in torque at 145° C. (min) | Temperature that could be used if scorch time of ref. at 135° C. were allowed | Temperature that could be used if scorch time of ref at 135° C. were allowed in % |
|---|---|---|---|---|---|---|
| formulation 1 | 50 | 172.1 | 89.6 | 51.7 | 142.5° C.[1] | 5.56% |
| formulation 2 | 44 | 171.5 | 88.5 | 50.5 | 140.2° C.[1] | 3.85% |
| ref. | 56 | 72 | 43 | 25 | 135° C. | 0% |
| comp. formulation 1 | 51 | 110.5 | 65.6 | 38.0 | | |

[1]calculated via the exponential curve obtained from the scorch times measured at different temperatures.

Again, the data clearly indicate an improvement of scorch performance when a composition according to the present invention is used, even if the unsaturated polyolefin contains a high amount of double bonds.

Example 3

In this example, the total weight loss was measured as indicated above. The results are summarised in table 5.

Furthermore, Table 5 provides data for the time which is necessary to obtain a by-product level of 0.5 wt % when the polymer compositions are subjected to a thermal treatment at 60° C. The values shown in the table were obtained as follows: The samples were stored at 60° C. and the weight was measured continuously until there was no further measurable change of weight between two consecutive measurements. Normally, these conditions were obtained after 168 h degassing time. This weight of the specimen was used as the base line for the calculations of the 0.5 wt % level of by-products. The period of time for the reference material to reach a residual by-product level of 0.5 wt % was 19 h. These measurements were carried out on a crosslinked plaque with an area of 6-7 cm×6-7 cm and around 1.8 mm thick.

TABLE 5

Total weight loss and time for removal of by-products

| sample | total weight loss after 168 h (%) | time to reach 0.5 wt % by-product level when treated at 60° C. (h) | time to reach 0.5 wt % by-product level when treated at 60° C. in (%) |
|---|---|---|---|
| inventive formulation 1 | 0.94 | 11 | 57% |
| inventive formulation 2 | 1.33 | 15 | 79% |
| inventive formulation 3 | 1.35 | 16 | 84% |
| inventive formulation 4 | 1.54 | 17 | 89% |
| inventive formulation 5 | 1.37 | 15 | 79% |
| inventive formulation 6 | 1.50 | 17 | 89% |
| inventive formulation 7 | 1.67 | | |
| inventive formulation 8 | 1.77 | | |
| reference | 1.94 | 19 | 100% |

If a lower peroxide loading can be used to result in the same crosslinking degree, this will also have a beneficial impact on degassing behaviour since less by-products have to be removed during the degassing step. This effect is exemplified by the results shown in table 5.

Furthermore, the results of table 5 clearly demonstrate that volatile by-products can be removed from the inventive formulations much faster. Although all materials have a similar degree of crosslinking as indicated by the hot set values, the inventive formulations result in polymeric networks from which volatile by-products can be removed faster. Thus, high quality cables having a low amount of detrimental volatile by-products within the cable layers can be obtained at higher production rate.

Example 4

In this example, the weight loss rate changes have been determined as indicated above. The results are shown in table 6.

TABLE 6

Summary of weight rate changes

| Sample | Total weight change (0-30 min.) (in %) | Rate of weight change (0-5 min.) (in %) |
|---|---|---|
| Inventive formulation 1 | 0.550 | 0.085 |
| Inventive formulation 2 | 0.774 | 0.108 |
| Inventive formulation 3 | 0.740 | 0.110 |
| Inventive formulation 4 | 0.883 | 0.153 |
| Inventive formulation 5 | 0.755 | 0.136 |
| Inventive formulation 6 | 0.923 | 0.160 |
| Inventive formulation 7 | 0.868 | 0.132 |
| Inventive formulation 8 | 0.982 | 0.149 |
| reference | 1.116 | 0.181 |

All formulations according to the present invention show a lower rate of weight change than the reference which indicates that less material is to be removed by degassing.

The invention claimed is:

1. A crosslinkable polymer composition, comprising
(i) an unsaturated polyolefin having a total amount of carbon-carbon double bonds/1000 carbon atoms of at least 0.1, wherein the unsaturated polyolefin is an unsaturated polyethylene,
(ii) at least one scorch retarder present in an amount of 0.005 wt % to 1.0 wt % of the crosslinkable polymer composition, and
(iii) at least one crosslinking agent.

2. The polymer composition according to claim 1, wherein the unsaturated polyolefin has a total amount of carbon-carbon double bonds/1000 carbon atoms of at least 0.35.

3. The polymer composition according to claim 1, wherein at least some of the carbon-carbon double bonds are vinyl groups.

4. The polymer composition according to claim 3, wherein the unsaturated polyolefin has a total amount of vinyl groups/1000 carbon atoms of at least 0.04.

5. The polymer composition according to claim 1, wherein the unsaturated polyolefin is prepared by copolymerizing an olefin monomer and at least one polyunsaturated comonomer.

6. The polymer composition according to claim 5, wherein the unsaturated polyolefin has an amount of vinyl groups/1000 carbon atoms which originate from the polyunsaturated comonomer, of at least 0.03.

7. The polymer composition according to claim 5, wherein at least one polyunsaturated comonomer is a diene.

8. The polymer composition according to claim 7, wherein the diene is selected from 1,7-octadiene, 1,9-decadiene, 1,11-dodecadiene, 1,13-tetradecadiene, 7-methyl-1,6-octadiene, 9-methyl-1,8-decadiene, or mixtures thereof.

9. The polymer composition according to claim 7, wherein the diene is selected from siloxanes having the following formula:

$$CH_2=CH-[Si(CH_3)_2-O]_n-Si(CH_3)_2-CH=CH_2,$$

wherein n=1 or higher.

10. The polymer composition according to claim 5, wherein the unsaturated polyolefin has an ash content of less than 0.030 wt.-%.

11. The polymer composition according to claim 1, wherein at least one crosslinking agent is a peroxide.

12. The polymer composition according to claim 1, wherein the unsaturated polyethylene is produced by high pressure radical polymerisation.

13. The polymer composition according to claim 1, wherein the scorch retarder is selected from 2,4-diphenyl-4-methyl-1-pentene, substituted or unsubstituted diphenylethylene, quinone derivatives, hydroquinone derivatives, monofunctional vinyl containing esters and ethers, or mixtures thereof.

14. A multilayered article, having at least one layer comprising the crosslinkable polymer composition according to claim 1.

15. The multilayered article according to claim 14, wherein the article is a power cable.

16. A crosslinked polymer composition, prepared by treatment of the polymer composition according to claim 1 under crosslinking conditions.

17. The crosslinked polymer composition according to claim 16, wherein the percentage level of removable volatiles remaining in the crosslinked polymer composition is less than or equal to 0.5 wt % of the crosslinked polymer composition after a period of time which is at least 10% shorter compared to the period of time which is necessary to decrease the level of volatiles in a reference material to the same value, wherein the reference material is a crosslinked polymer composition prepared from an unsaturated polyolefin having a total amount of carbon-carbon double bonds/1000 carbon atoms of 0.37 and a crosslinking agent but without a scorch retarder.

18. The crosslinked polymer composition according to claim 16, having a total weight change between 0-30 minutes at 175° C. of less than 1.12 wt.-% as measured according to HD632 A:1 1998, part 2 on a plaque having a thickness of 1.8 mm.

19. A crosslinked multilayered article, having at least one layer comprising the crosslinked polymer composition according to claim 16.

20. The crosslinked multilayered article according to claim 19, wherein the article is a power cable.

21. A process for the preparation of a crosslinked polymer composition, wherein the crosslinkable polymer composition according to claim 1 is provided, followed by treatment of the polymer composition under crosslinking conditions.

22. The process according to claim 21, wherein the crosslinkable polymer composition is subjected to a temperature sufficient to effect at least partial crosslinking.

23. A process for the production of a multilayered article, wherein the crosslinkable polymer composition according to claim 1 is applied as one or more layers onto a substrate by extrusion.

24. The process according to claim 23, wherein extrusion is effected at a temperature satisfying the following relationship:

$$(19517/(273.15+T))-\ln t \leq 43.55$$

wherein

T: extrusion temperature in ° C., and t: time in minutes it takes at the extrusion temperature T from the start of the torque measurement to reach an increase in torque of 1 dNm from the minimum value in the torque curve.

25. The process according to claim 23, wherein the unsaturated polyolefin, the crosslinking agent and the scorch retarder are blended in a single step, followed by feeding the obtained mixture into the extruder.

26. The process according to claim 23, wherein the crosslinkable polymer composition is prepared by blending the unsaturated polyolefin with the scorch retarder first, followed by blending the obtained mixture with the crosslinking agent, and feeding the final mixture into the extruder.

27. The process according to claim 23, wherein a melt of the unsaturated polyolefin is provided in the extruder, followed by adding the scorch retarder and the crosslinking agent in the hopper or to the melt, either simultaneously or in subsequent steps.

28. The process according to claim 23, wherein the multilayered article is a power cable and the crosslinkable polymer composition is applied onto the metallic conductor and/or at least one coating layer thereof.

29. The process according to claim 23, wherein the crosslinkable polymer composition is treated under crosslinking conditions.

30. The process according to claim 29, wherein after the crosslinkable polymer composition is treated under crosslinking conditions a degassing step is carried out to remove volatile products.

* * * * *